(12) United States Patent
Gunsberg et al.

(10) Patent No.: US 11,591,029 B2
(45) Date of Patent: Feb. 28, 2023

(54) RAILING ASSEMBLY FOR TRAILER

(71) Applicants: David Gunsberg, Oak Park, MI (US); Jeffrey Bronson, Taylor, MI (US)

(72) Inventors: David Gunsberg, Oak Park, MI (US); Jeffrey Bronson, Taylor, MI (US)

(*) Notice: Subject to any disclaimer, the term of this patent is extended or adjusted under 35 U.S.C. 154(b) by 196 days.

(21) Appl. No.: 17/091,653

(22) Filed: Nov. 6, 2020

(65) Prior Publication Data
US 2021/0139082 A1  May 13, 2021

Related U.S. Application Data

(60) Provisional application No. 62/932,098, filed on Nov. 7, 2019.

(51) Int. Cl.
| | | |
|---|---|---|
| *B62D 33/033* | (2006.01) | |
| *B62D 33/02* | (2006.01) | |
| *B60R 3/00* | (2006.01) | |
| *E04G 5/14* | (2006.01) | |
| *B62D 65/02* | (2006.01) | |

(52) U.S. Cl.
CPC ............ *B62D 33/033* (2013.01); *B60R 3/005* (2013.01); *B62D 33/0207* (2013.01); *B62D 65/02* (2013.01); *E04G 5/142* (2013.01)

(58) Field of Classification Search
CPC .. B62D 33/07; B62D 33/0222; B62D 33/033; B62D 63/08; B62D 33/0207; B62D 65/02; E04G 5/142; B60R 3/005
See application file for complete search history.

(56) References Cited

U.S. PATENT DOCUMENTS

| | | | |
|---|---|---|---|
| 7,063,186 B1 * | 6/2006 | Granke | E04G 21/3223 182/113 |
| 9,731,640 B1 | 8/2017 | Meacham et al. | |
| 2008/0157046 A1 | 7/2008 | Murphy | |
| 2009/0008042 A1 * | 1/2009 | Snyder | E06B 9/08 160/264 |
| 2013/0119651 A1 * | 5/2013 | Conny | B60R 3/005 248/214 |
| 2015/0060202 A1 * | 3/2015 | Fanello | B60R 3/005 182/113 |
| 2015/0137501 A1 * | 5/2015 | Kibler | B60R 3/005 280/837 |
| 2016/0311474 A1 * | 10/2016 | Conny | B62D 33/0222 |

(Continued)

FOREIGN PATENT DOCUMENTS

GB  2562593  * 11/2018 ............. B60R 21/06

OTHER PUBLICATIONS

Fall Protection Straps—Internet: https://www.cbf.uk.com/products/view/1263/894 Oct. 9, 2019. 2 pages.

(Continued)

*Primary Examiner* — Gregory A Blankenship
(74) *Attorney, Agent, or Firm* — Gregory D. Degrazia; Miller, Canfield, Paddock & Stone

(57) ABSTRACT

A railing assembly includes at least one ratcheting post and at least one connection post. The at least one ratcheting post includes at least one ratcheting assembly attached to the at least one ratcheting post for selectively engaging a strap and the at least one connecting post including at least one attachment point for engaging an attachment member on the strap.

19 Claims, 7 Drawing Sheets

(56) References Cited

U.S. PATENT DOCUMENTS

2019/0389387 A1* 12/2019 Erickson ................ B60R 3/005
2021/0139082 A1* 5/2021 Gunsberg ........... B62D 33/0207

OTHER PUBLICATIONS

SpanSet WebRail—Heavy Vehicle Fall Protection Flyer. Internet: https://www.spanset.com/au. 2 pages.
SpanSet WebRail—Height Safety Lifting Load Control and Safety Management. Webrail Heavy Vehicle Fall Protection System. Technical Data Sheet. Internet: https://www.spanset.com/au. 5 pages.
Load Restraint—Commercial Body Fittings Ltd.—8th Edition; 12 pages. Website: www.cbf.uk.com.

* cited by examiner

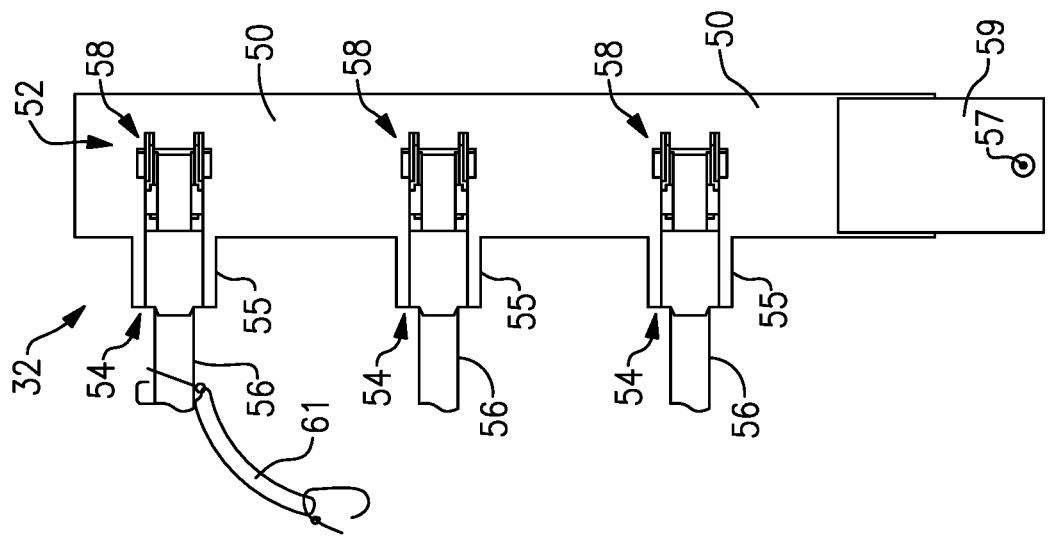
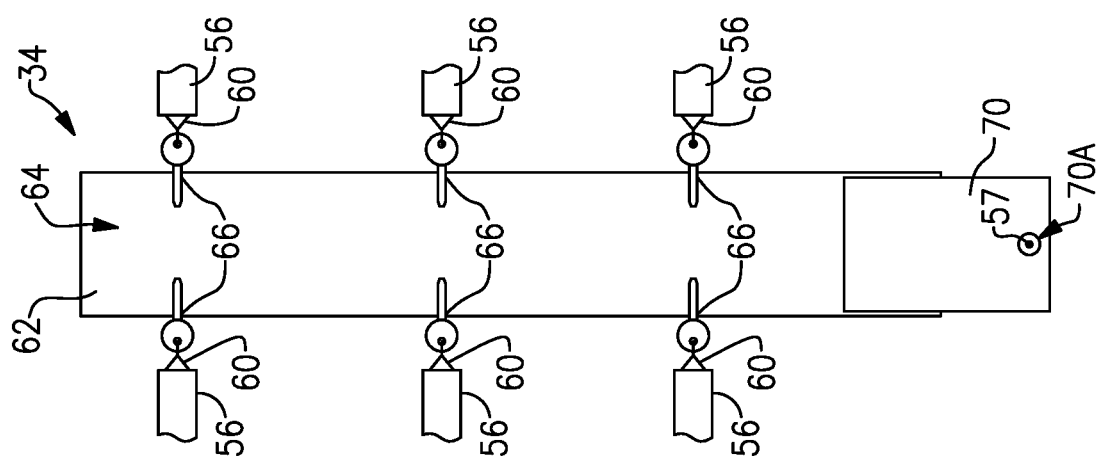
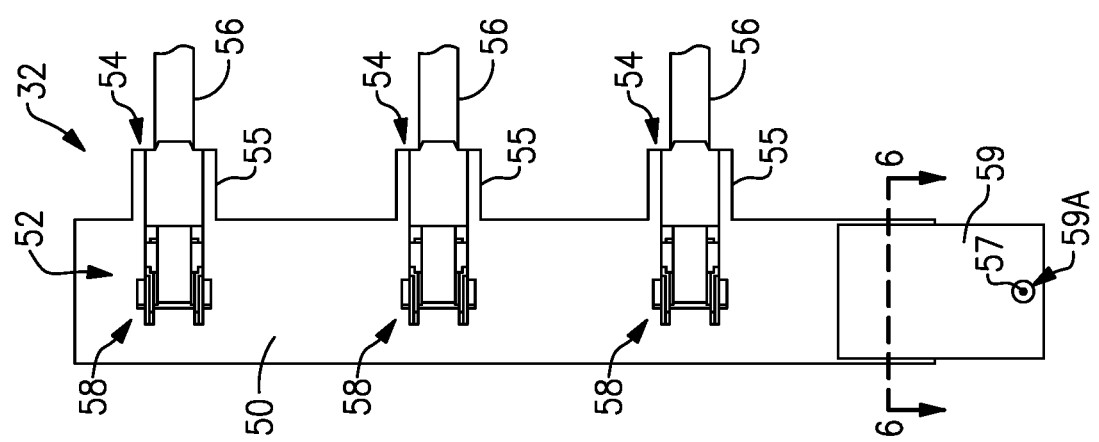

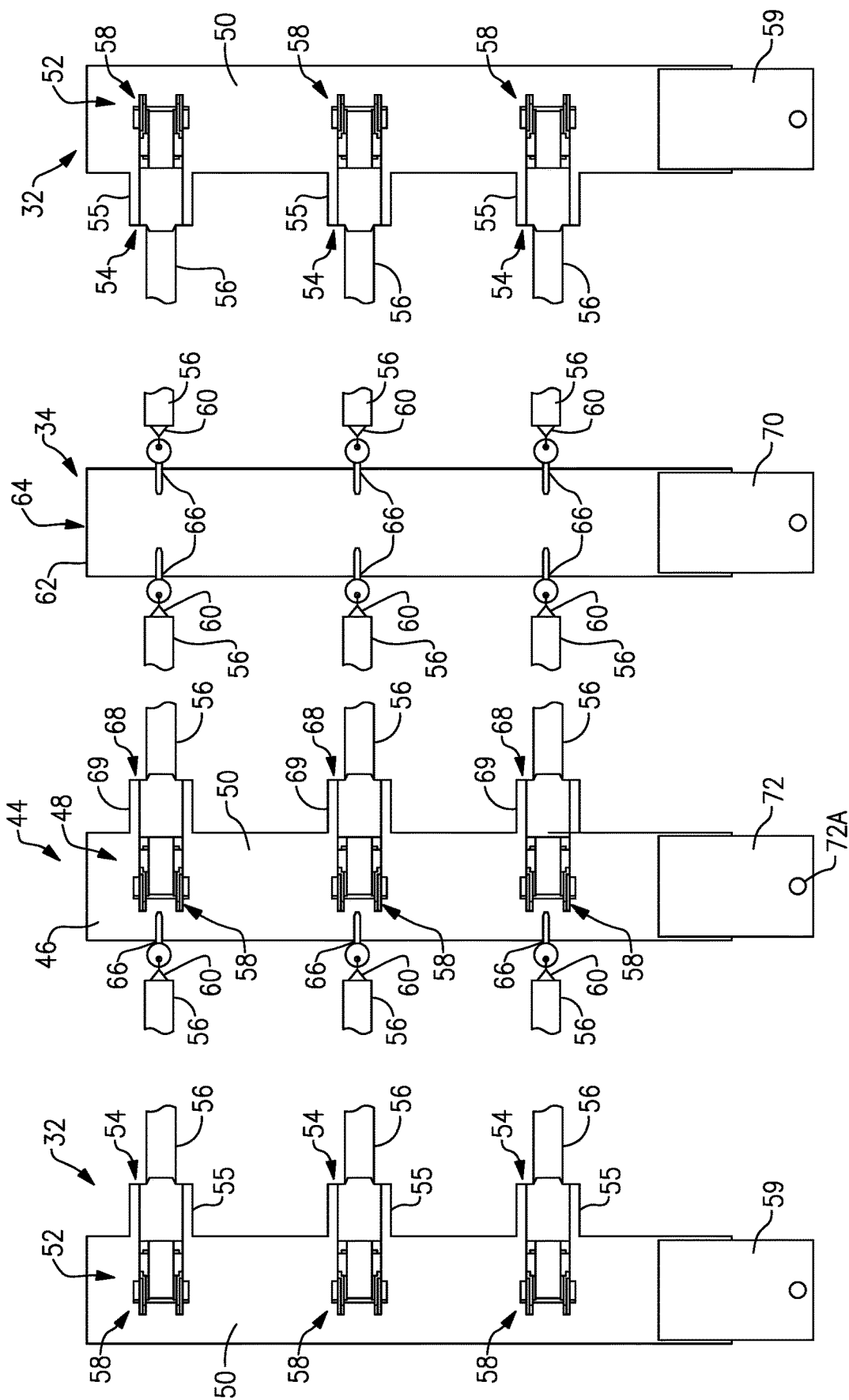

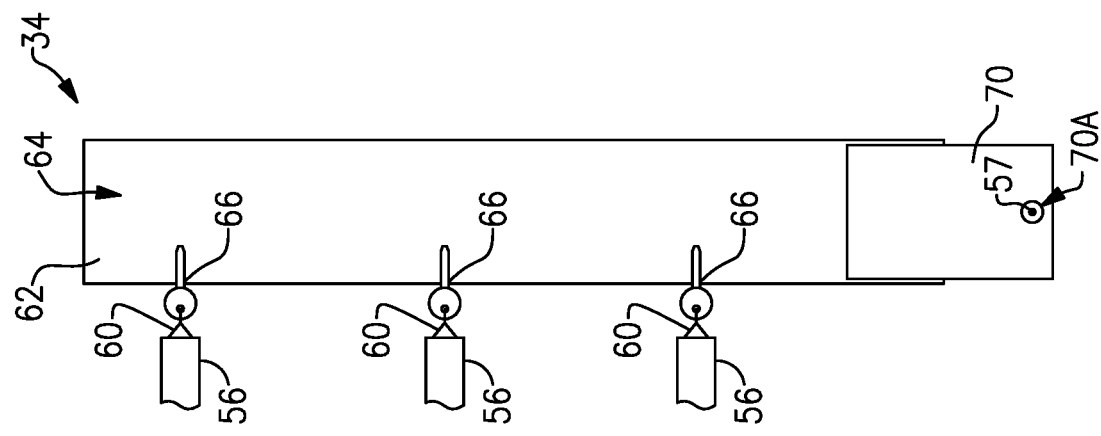
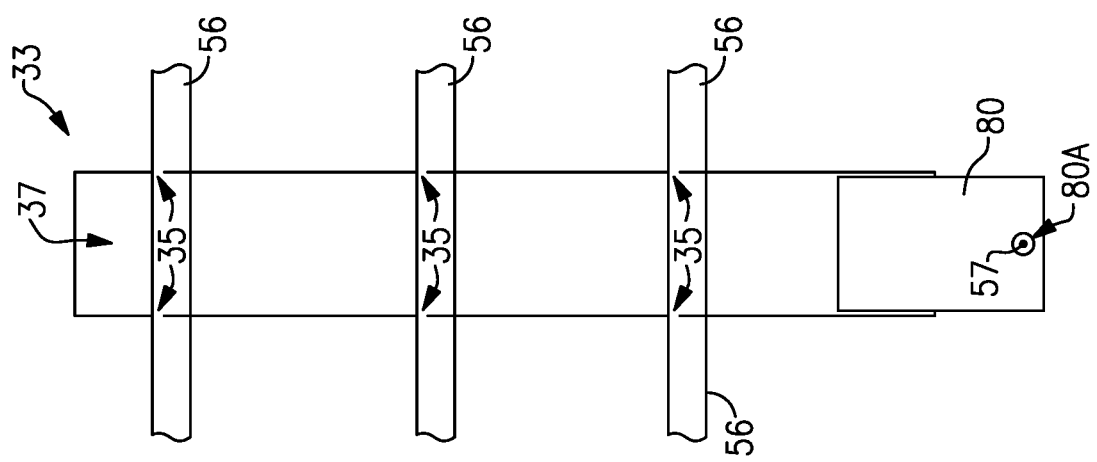
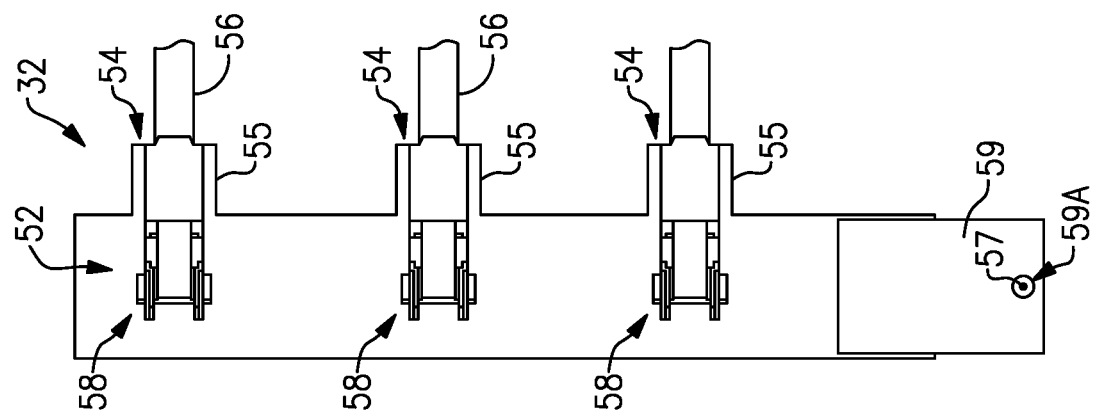

RAILING ASSEMBLY FOR TRAILER

CROSS-REFERENCE TO RELATED APPLICATIONS

This application claims priority to U.S. Provisional Application No. 62/932,098, which was filed on Nov. 7, 2019 and is incorporated herein by reference.

BACKGROUND

The present disclosure relates to a railing system and more particularly to a railing system for use with a trailer, such as a flatbed cargo trailer.

When a flatbed trailer is being loaded or unloaded from the ground, the trailer may be positioned between a pair of deck structures that are generally aligned with a support surface on the trailer. The deck structures can include a deck surface for walking on and a railing along at least a portion of a perimeter of the deck surface. In some examples, the deck surface may be several feet above the ground. However, deck structures are expensive, large, and difficult to store when not in use. Additionally, these structures can require maintenance, such as wheel repairs, that can make them unusable.

SUMMARY

A railing assembly with at least one ratcheting post and at least one connection post. The at least one ratcheting post includes at least one ratcheting assembly attached to the at least one ratcheting post for selectively engaging a strap and the at least one connecting post including at least one attachment point for engaging an attachment member on the strap.

A method of installing a railing system includes securing a ratcheting post and a connecting post to a support surface of a trailer and at least one strap is connected between the ratcheting post and the connecting post.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 4A schematically illustrates an interior view of an example ratcheting post of the railing assembly of FIG. 1.

FIG. 4B schematically illustrates an interior view of an example connecting post of the railing assembly of FIG. 1.

FIG. 4C schematically illustrates an interior view of another example ratcheting post of the railing assembly of FIG. 1.

FIGS. 5A-5D schematically illustrate an interior view of the railing assembly shown in FIG. 2.

FIG. 5B schematically illustrates an interior view of an example ratcheting/connecting post of the railing assembly of FIG. 2.

FIG. 5C schematically illustrates an interior view of an example connecting post of the railing assembly of FIG. 2.

FIG. 5D schematically illustrates an interior view of another example ratcheting post of the railing assembly of FIG. 2.

FIG. 10A schematically illustrates an interior view of an example ratcheting post of the railing assembly of FIG. 9.

FIG. 10B schematically illustrates an interior view of an example intermediate post of the railing assembly of FIG. 9.

FIG. 10C schematically illustrates an interior view of another example intermediate post of the railing assembly of FIG. 9.

DETAILED DESCRIPTION

Figure 1:
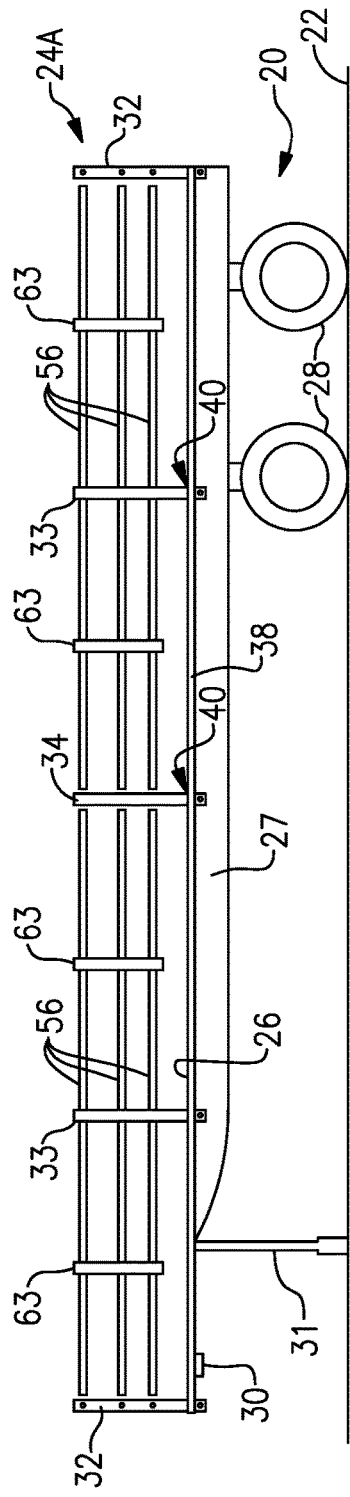
FIG. 1 schematically illustrates an example trailer having an example railing assembly.
Figure 2:
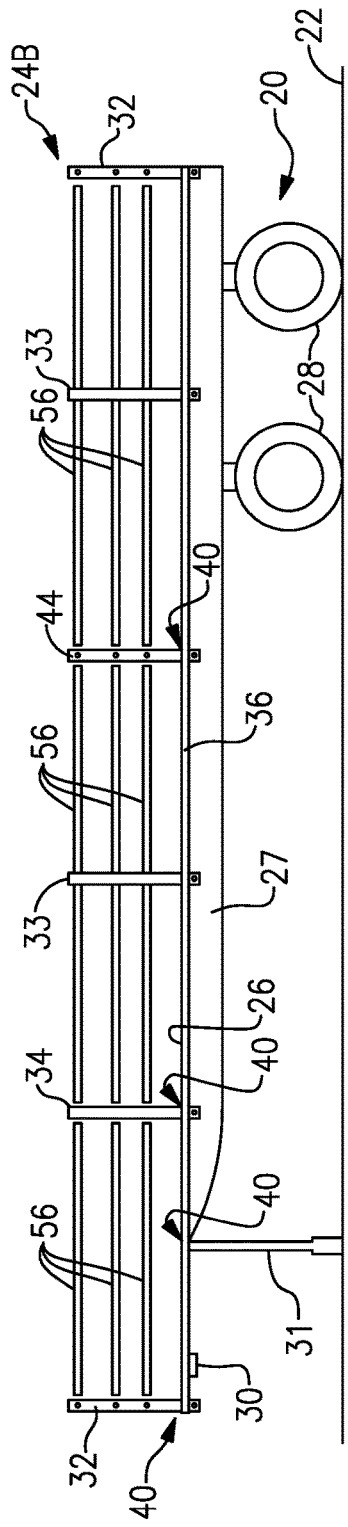
FIG. 2 schematically illustrates the example trailer having another example railing assembly.

FIGS. 1 and 2 illustrate an example trailer 20 located on a drivable surface 22, such as a road or a piece of ground, having a railing assembly 24A or 24B, respectively. The trailer 20, such as a flatbed trailer, includes a support surface 26 for supporting goods thereon. The support surface 26 is supported by a frame 27 on an underside of the support surface 26 and a plurality of wheels 28 are rotatable attached to the frame 27 adjacent an aft portion of the support surface 26. The trailer 20 also includes a trailer attachment point 30 for attaching the trailer 20 to a vehicle, such as a semi-truck, for transporting the trailer 20 between multiple locations. When the trailer 20 is not attached to the vehicle, at least one support 31 is lowered to engage the drivable surface 22 to maintain the support surface 26 in a suitable orientation for walking on, such horizontal or level with respect to the ground. In the illustrated example, an uppermost one of the straps 56 is between approximately 48-52 inches (1.2-1.3 meters) from the support surface 26.

The railing assemblies 24A and 24B include a plurality of posts, such as at least one ratcheting post 32, at least one intermediate post 33, at least one connecting post 34, and/or at least one ratcheting/connecting post 44. In the illustrated example, the plurality of posts 32, 33, 34, and 44 are interconnected by sets of three horizontally extending straps 56 arranged vertically from each other. However, more or less than three straps 56 extending between adjacent posts 32, 33, 34, and 44 could be used. The straps 56 can be made from a natural or synthetic fibers to allow the straps to be flexible, durable, and easy to store when not in use. The straps 56 are lightweight and easier to maneuver compared to metal bars. Additionally, the uppermost strap 56 is arranged to provide support similar to a hand rail. The straps 56 can also be surrounded by a brace strap 63 extending vertically and fastened on opposing ends, such as by a hook and loop closure, to prevent the straps 56 from separating from each other.

Figure 9:
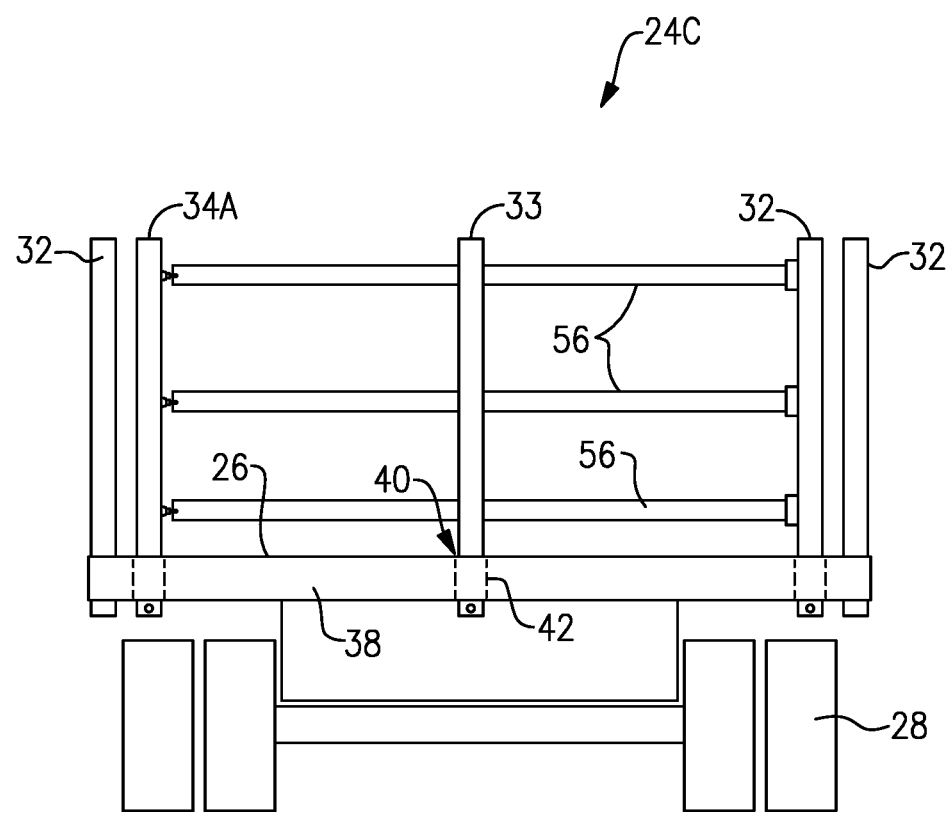
FIG. 9 schematically illustrates a rear view of the trailer having yet another example railing assembly.

Each of the plurality of posts 32, 33, 34, and 44 attach along edges 36 of the support surface 26. An outer rail 38 is located along opposing longitudinal edges 36 of the support surface 26. Additionally, it is possible that the outer rail 38 could wrap around a front side and/or a rear side of the support surface 26 for accepting a railing assembly 24C as shown in FIG. 9.

Figure 3:
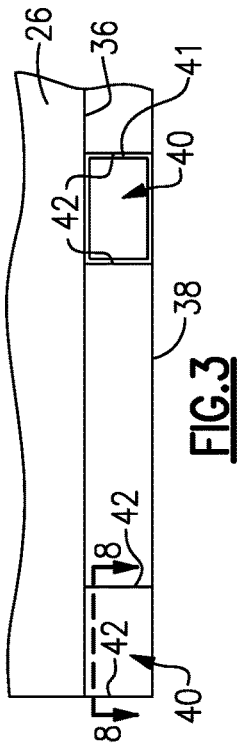
FIG. 3 schematically illustrates an enlarged view of a portion of a support surface on the example trailer of FIGS. 1 and 2.

As shown in FIG. 3, a plurality of post receiving pockets 40 are defined at least partially by the edge 36 of the support surface 26, the outer rail 38, and a plurality of connecting members 42. A shim 41 having a varying thickness can be located in the pocket 40 to reduce clearance with the posts 32, 33, 34, and 44. The plurality of connecting members 42 extend between the edge 36 and the outer rail 38 to secure the outer rail 38 to the edge 36 of the support surface 26. The outer rail 38 also protects attachment devices, such as straps or chains, that extend around the edge 36 of the support surface 26 for securing goods to the support surface 26. As shown in FIGS. 1-3, there are multiple post receiving pockets 40 located around the edge 36 of the support surface 26 to provide a variety of attachment locations for the ratcheting posts 32, the intermediate posts 33, the connecting posts 34, and/or the ratcheting/connecting posts 44.

Figure 4D:
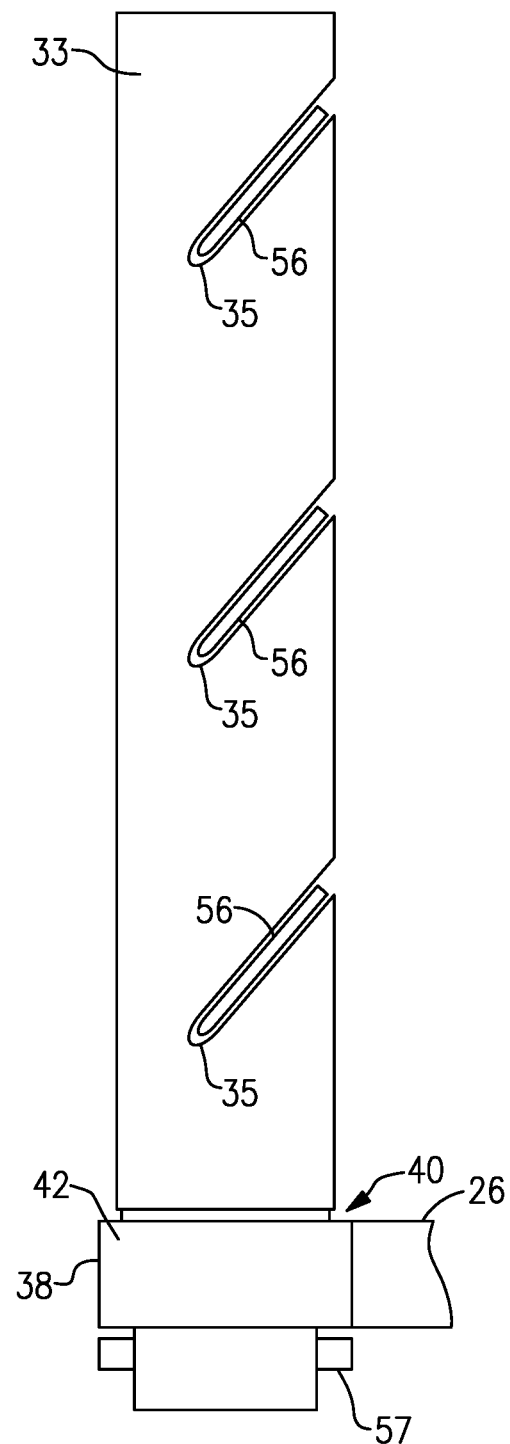
FIG. 4D schematically illustrates a side view of an example intermediate post of the railing assembly of FIG. 1.

FIGS. 4A-4C schematically illustrate an interior view of the railing assembly 24A shown in FIG. 1 and provide further detail regarding the straps 56 extending between the posts 32, 34, and 44. Additionally, FIG. 4D schematically illustrates a side view of the intermediate post 33 supporting the straps 56. The railing assembly 24A includes a pair of ratcheting posts 32 (FIGS. 4A and 4C) located at a front and rear of the support surface 26 and a single connecting post 34 (FIG. 4B) located between the pair of ratcheting posts 32.

In the illustrated example, the ratcheting post 32 includes a C-shaped channel 52 that extends vertically from the support surface 26. The C-shaped channel 52 defines a central body portion 50. A plurality of strap channels 54 extend along one edge of the central body portion 50. The strap channels 54 accept at least one of a strap 56 and/or a ratchet assembly 58 for tensioning between the ratcheting post 32 and the connecting post 34. In the illustrated example, the ratchet assembly 58 is rotary operated by a lever handle. The ratchet assembly 58 allows the strap 56 to be tensioned such that the upper most strap 56 will not deflect by more than approximately 12 inches (0.3 meters).

Figure 7:
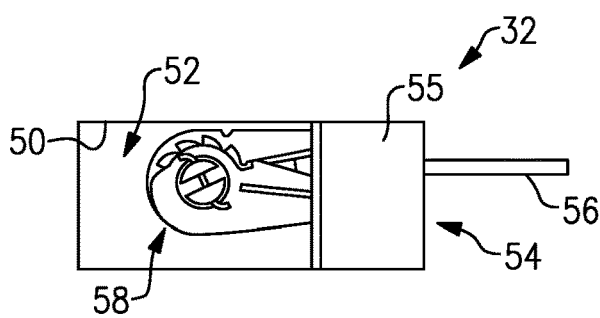
FIG. 7 schematically illustrates a top view of the example ratcheting post.
Figure 8:
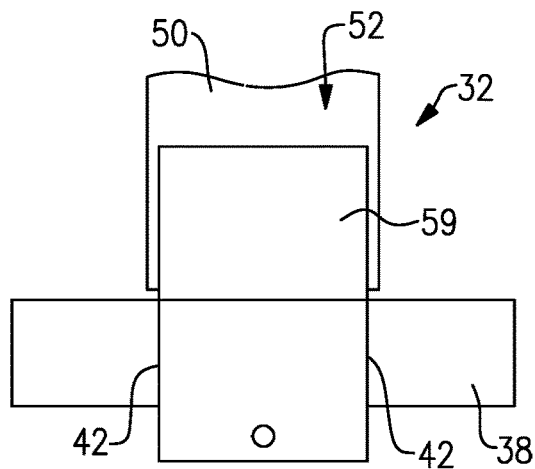
FIG. 8 schematically illustrates a cross-section view taken along line 8-8 of FIG. 3.

The strap channels 54 include a C-shaped channel at least partially defining a central body portion 55 that extends in a generally perpendicular direction relative to a longitudinal direction of the central body portion 50. The central body portion 55 of the strap channel 54 is in the same plane as the central body portion 50 (FIGS. 4A and 7). The ratcheting posts 32 shown in FIGS. 4A and 4C are also mirror images of each other such that they can be located at opposing ends of the support surface 26. In another example, the ratcheting posts 32 could be identical and rotated relative to each other such that one has the C-shaped channel 52 facing inward and the other has the C-shaped channel facing outward.

Figure 6:
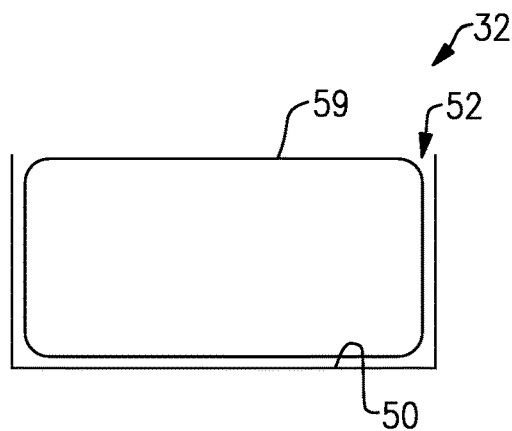
FIG. 6 schematically illustrates a cross-sectional view taken along line 6-6 of FIG. 4A.

A pocket projection 59 also extends from a proximal end of the C-shaped channel 52 and is in an overlapping relationship with the C-shaped channel 52 to be received in the pockets 40 adjacent the support surface 26 of the trailer 20. In the illustrated examples shown in FIGS. 4A, 4C, and 6, the pocket projection 59 is fixed relative to the C-shaped channel 52 and includes a square or rectangular cross-section with rounded corners to facility insertion into the pockets 40. The pocket projection 59 can also include a retainer opening 59A for accepting a retainer 57, such as a pin or fastener, when the pocket projection 59 is placed within one of the pockets 40. One feature of the retainer 57 is to prevent the post 32 from being removed from the pocket 40.

As shown in FIG. 4B, the connecting post 34 includes three pairs of grommets 66 with one grommet 66 of each pair located on opposite sides of a C-shaped channel 64. In the illustrated example, distal ends of the straps 56 opposite the ratchet assembly 58 include hooks 60 that engage a corresponding one of the grommets 66. The connecting post 34 includes a central body portion 62 between opposing sides of the C-shaped channel 64. The grommets 66 are aligned with a corresponding one of the ratchet assemblies 58 on one of the ratcheting posts 32. The grommets 66 can be bolted or welded to the C-shaped channel 64.

A pocket projection 70 extends from a proximal end of the C-shaped channel 64 to be received in the pockets 40 adjacent the support surface 26, similar to the pocket projections 59 described above. In the illustrated examples show in FIG. 4B, the pocket projection 70 is a sleeve fixed relative to the C-shaped channel 64 and includes a square or rectangular cross-section with rounded corners to facility insertion into the pockets 40. The pocket projection 70 can also include a retainer opening 70A for accepting one of the retainers 57 when the pocket projection 70 is placed within one of the pockets 40. One feature of the retainer 57 is to prevent the post 34 from being removed from the pocket 40.

As shown in FIG. 4D, when a distance between the ratcheting posts 32 and the connecting posts 34 exceeds a predetermined threshold, such as 20 feet, one of the intermediate posts 33 may be located between the ratcheting post 32 and the connecting post 34. The intermediate posts 33 include a plurality of slots 35 in opposing edges of the C-shaped channel that extend downward at approximately 45 degrees relative to outer edges of the C-shaped channel. The slots 35 accommodate the straps 56 spanning a C-shaped channel 37 (FIG. 10B) between opposing edges of the post 33. The slots 35 provide vertical support to the straps 56 while allowing the straps 56 to move freely in a lateral or lengthwise direction.

One feature of utilizing the ratcheting posts 32 with the connecting post 34 is the ability to selectively position the railing assembly 24A along the support surface 26. For example, the ratcheting posts 32 could be located at the longitudinal ends of the support surface 26 or spaced inward from the longitudinal ends of the support surface 26 depending on the application. Additionally, the straps 56 between the forward most ratcheting post 32 and an adjacent connecting post 34 could be removed to provide access to the support surface 26 while the remaining straps 56 are left in place. Furthermore, the connecting post 34 could be located in any of the pockets 40 between the ratcheting posts 32 depending on the application. Moreover, a tie-off lanyard 61 could be attached to any one of the straps 56 to be used by a worker on the support surface 26.

FIGS. 5A-5D illustrate an interior view of the example railing assembly 24B shown in FIG. 2 without illustrating the intermediate posts 33 described above. The railing assembly 24B is similar to the railing assembly 24A except where described below or shown in the Figures. Similar numbers will be used between the railing assembly 24A and the railing assembly 24B to identify the same or similar components.

In addition to having the pair of ratcheting posts 32, the at least one intermediate post 33, and the at least one connecting post 34 as shown in FIGS. 1 and 4A-4D, the railing assembly 24B includes a ratcheting/connecting post 44 located inward from the pair of ratcheting posts 32 and adjacent the connecting post 34. The ratcheting/connecting post 44 includes a central body portion 46 forming a C-shaped channel 48 with grommets 66 located adjacent one side similar to the connecting post 34 and strap channels 68 located adjacent a second side opposite the first side similar to the ratcheting posts 32. The strap channels 68 are at least partially defined by a central body portion 69 that extends in a generally perpendicular direction relative to the longitudinal direction of the central body portion 46. The ratcheting/connecting posts 44 provide further flexibility in the number and size of opening formed along the edge 36 of the support surface 26 when removing straps 56 between adjacent posts 32, 34, or 44.

Additionally, ratcheting/connecting posts 44 include a pocket projection 72 with a retainer opening 72A for accepting the retainer 57 when the pocket projection 70 is placed within one of the pockets 40. One feature of the retainer 57 is to prevent the post 34 from being removed from the pocket 40.

FIG. 9 illustrates the railing assembly 24C along the rear of the trailer 26, but the railing assembly 24C could also be located along a front of the trailer 26 as well. The railing assembly 24C is similar to the railing assemblies 24A and 24B except where described above or shown in the Figures.

As shown in FIGS. 10A-10C, the railing assembly 24C includes the ratcheting post 32 with straps 56 that extend to a single sided connecting post 34A. The single sided connecting post 34A is similar to the connecting post 34 except that the grommets 66 are only located along a single side of the post 34A. However, the connecting post 34 could still be used with the railing assembly 24C but with only one set of the grommets 66 engaging the straps 56. The intermediate post 33 is located between the ratcheting post 32 and the connecting post 34A and supports the straps 56 in the slots 35. The intermediate post 33 also includes a pocket projection 80 having a retainer opening 80A for accepting one of the retainers 57 as described above with the respect to the pocket projection 70. Additionally, the railing assembly 24C could eliminate the intermediate post 33 depending on a width of the railing assembly 24C.

One feature of the above describe railing systems 24 is the ability to store the railing system 24 on the vehicle or trailer 24 without requiring significant storage space or having a significant weight, such as with other prior art systems that can weigh over a thousand pounds which decreases the load carrying capacity of the trailer 20. The railing systems 24 are also customizing in railing length as the user can select the pockets 40 best suited to provide access to the support surface 26. The components in the railing system 24 are also easily interchangeable and replaceable.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A railing assembly comprising:
    at least one ratcheting post including at least one ratcheting assembly attached to the at least one ratcheting post for selectively engaging a strap;
    at least one connecting post including at least one attachment point for engaging an attachment member on the strap; and
    an intermediate post disposed between the ratcheting post and the connecting post and defining a strap slot for receiving the strap extending between the ratcheting post and the connecting post.

2. The railing assembly of claim 1, wherein the at least one ratcheting assembly includes a plurality of ratcheting assemblies spaced along the at least one ratcheting post.

3. The railing assembly of claim 2, wherein the at least one connecting post includes a plurality of attachment points each corresponding to one of the plurality of ratchet assemblies.

4. The railing assembly of claim 2, wherein the plurality of ratcheting assemblies is rotary operated.

5. The railing assembly of claim 2, wherein the at least one attachment point includes a grommet.

6. The railing assembly of claim 1, including at least one ratcheting and connecting post having at least one ratcheting assembly located along a first longitudinal edge and at least one attachment point located along a second opposite longitudinal edge.

7. The railing assembly of claim 6, wherein the at least one ratcheting assembly on the at least one ratcheting and connecting post includes a plurality of ratcheting assemblies.

8. The railing assembly of claim 7, wherein the at least one attachment point on the at least one ratcheting and connecting post includes a plurality of attachment points.

9. The railing assembly of claim 6, wherein the intermediate post defines a plurality of strap slots located on opposing lateral edges.

10. The railing assembly of claim 1, wherein the intermediate post defines a plurality of strap slots located on opposing lateral edges of the intermediate post.

11. The railing assembly of claim 1, wherein the at least one ratcheting post and the at least one connecting post have a C-shaped cross section.

12. The railing assembly of claim 11, wherein the at least one ratcheting post and the at least one connecting post each include a pocket projection extending from a proximal end.

13. The railing assembly of claim 1, wherein the at least one connecting post includes a plurality of attachment points along a single edge.

14. The railing assembly of claim 1, wherein the at least one connecting post includes a plurality of attachment points along a pair of opposing edges.

15. A railing assembly comprising:
    at least one ratcheting post including at least one ratcheting assembly attached to the at least one ratcheting post for selectively engaging a strap;
    at least one connecting post including at least one attachment point for engaging an attachment member on the strap; and
    a strap channel extending from a longitudinal side of the at least one ratcheting post.

16. The railing assembly of claim 15, wherein the at least one ratcheting post includes a central body portion in the same plate as a central body portion of the strap channel.

17. The railing assembly of claim 16, wherein the at least one ratcheting post and the strap channel have a C-shaped cross section.

18. A method of installing a railing system comprising:
   securing a ratcheting post to a support surface of a trailer;
   securing a connecting post to the support surface of the trailer;
   connecting at least one strap from the ratcheting post to the connecting post; and
   supporting the at least one strap in a slot defined by an intermediate post that allows for lateral movement of the at least one strap.

19. The method of claim 18, including tensioning the at least one strap with a ratchet assembly on the ratcheting post.

* * * * *